S. K. DEVEREUX.

Shirt Bosom.

No. 9,554. Reissued Feb. 8, 1881.

WITNESSES

B. W. Williams

George V. Mallon

INVENTOR

Seth K. Devereux

By his Att'y.

Henry W. Williams

N. PETERS, PHOTO-LITHOGRAPHER, WASHINGTON, D. C.

UNITED STATES PATENT OFFICE.

SETH K. DEVEREUX, OF CASTINE, MAINE.

SHIRT-BOSOM.

SPECIFICATION forming part of Reissued Letters Patent No. 9,554, dated February 8, 1881.

Original No. 232,696, dated September 28, 1880. Application for reissue filed December 6, 1880.

*To all whom it may concern:*

Be it known that I, SETH K. DEVEREUX, of Castine, in the county of Hancock and State of Maine, have invented a new and useful Improvement in Shirt-Bosoms, of which the following is a specification.

The object of this invention is to provide a shirt-bosom which will preserve its smooth shape unrumpled and without bunching, especially at its exposed portion, in whatever position, such as sitting, lying, bending over, &c., the wearer may be.

The central plait of the bosom is provided with one or more (usually two) vertical beads, forming pockets, in which are thrust thin strips of whalebone or other suitable material, such strips and pockets extending from just below the neckband to about the lower extremity of the breast-bone. In order to prevent the strips from slipping out of the pockets, a socket-frame, into which the lower ends of the strips may be placed, may be removably secured to the bosom.

Figure 1:
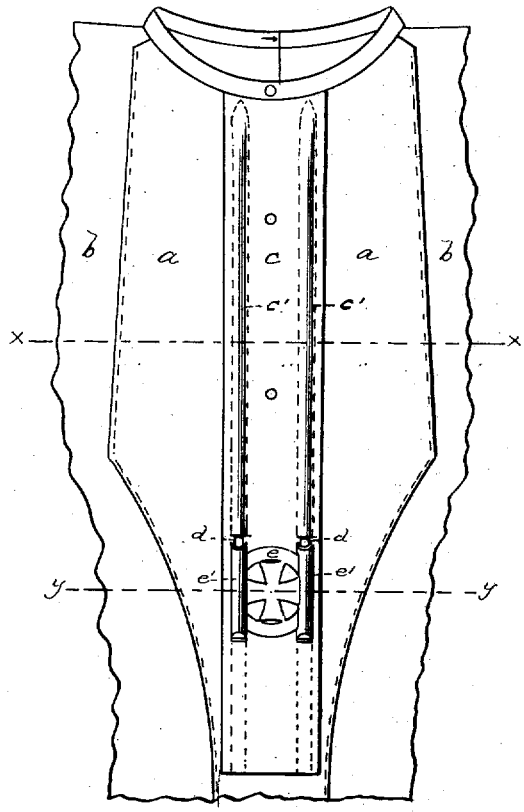
Figure 2:
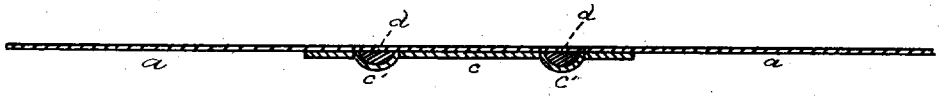
Figure 3:
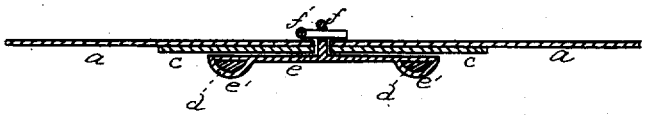

In the accompanying drawings, in which similar letters of reference indicate like parts, Figure 1 is a front view of a shirt-bosom having my improvement applied thereto, and a portion of the shirt of which the bosom is a part. Fig. 2 is a sectional view on line *x x*, Fig. 1. Fig. 3 is a sectional view on line *y y*, Fig. 1.

*a* represents the bosom, and *b* a portion of the shirt. *c* is the central plait in the bosom, and is provided with two beads, *c′ c′*, near the opposite edges of said plaits. Of course, if the bosom were plain, (without plaits,) the beads would be at or near the central portion, one on each side the stud-holes. These beads *c′* form pockets, which extend from near the neckband of the bosom to the lower end of the breast-bone of the wearer. Thrust into the pockets are stiffeners *d d*, made of whalebone, horn, or other suitable material, usually semicircular in shape, and extending the length of the pockets, or from just below the neckband to the lower end of the breast-bone.

In order to prevent the stiffeners from any danger of slipping out, their lower projecting ends are held in sockets *e′ e′* in the socket-frame *e*. This socket-frame, which may be of any desired shape and subjected to any degree of ornamentation, is removably fastened to the bosom in any convenient manner. In the drawings a loop, *f*, extends from the frame *e* through the bosom, and a spring-bar, *f′*, holds it on the rear side of the bosom. If desired, however, the socket-frame may be omitted and the stiffeners allowed to remain unsecured, save by the friction of the pockets or the starch in the bosom.

The upper portions of the beads or pockets *c′* may be tapered, as shown in Fig. 1, or not, as desired. If tapered, of course the ends of the stiffeners are correspondingly pointed.

By means of this improvement the bosom is kept absolutely smooth, and in consequence can be worn much longer without collecting dirt, besides presenting an elegant appearance.

Sockets may be placed on the upper ends of the stiffeners, if desired, to prevent puncturing the fabric.

I am aware that it is not new to apply stiffeners to shirt-bosoms for the purpose of keeping them smooth; but I know of no instance where the stiffeners formed of narrow thin strips were applied to the bosom at or near its center, nor where they were made about the length of the breast-bone, nor where sockets similar to those above described were provided. Did the stiffeners extend lower, they would interfere with the comfort of the wearer when bending the body.

I am also aware that plates or sheets of tin or other substance have been applied by means of corresponding pockets to shirt-bosoms for the purposes of protecting the lungs and keeping the bosom in shape, as shown in patent to W. R. Trask, granted September 23, 1873.

Having thus fully described my invention, what I claim, and desire to secure by Letters Patent, is—

1. As an improved article of manufacture, a shirt-bosom provided with one or more thin narrow stiffeners, *d*, said stiffeners being vertically inserted therein at or near the central portion of the bosom by means of corresponding narrow pockets or beads, substantially as and for the purpose set forth.

2. A shirt-bosom provided with one or more thin narrow stiffeners, *d*, vertically inserted therein at or near the central portion of the bosom by means of corresponding pockets or beads, the lower ends of said stiffeners being held by devices secured removably to the bosom, for the purpose of preventing them from slipping out, substantially as described.

3. The combination, with a shirt-bosom provided with the beads or pockets $c'$ near its center, containing stiffeners $d$, extending about the length of the breast-bone, of the socket-frame $e$, provided with sockets $e'$, said frame being removably secured to the bosom and holding the lower ends of the stiffeners, substantially as and for the purpose set forth.

SETH K. DEVEREUX.

Witnesses:

WESLEY VANWART,
JAMES A. VANWART.